No. 756,833.

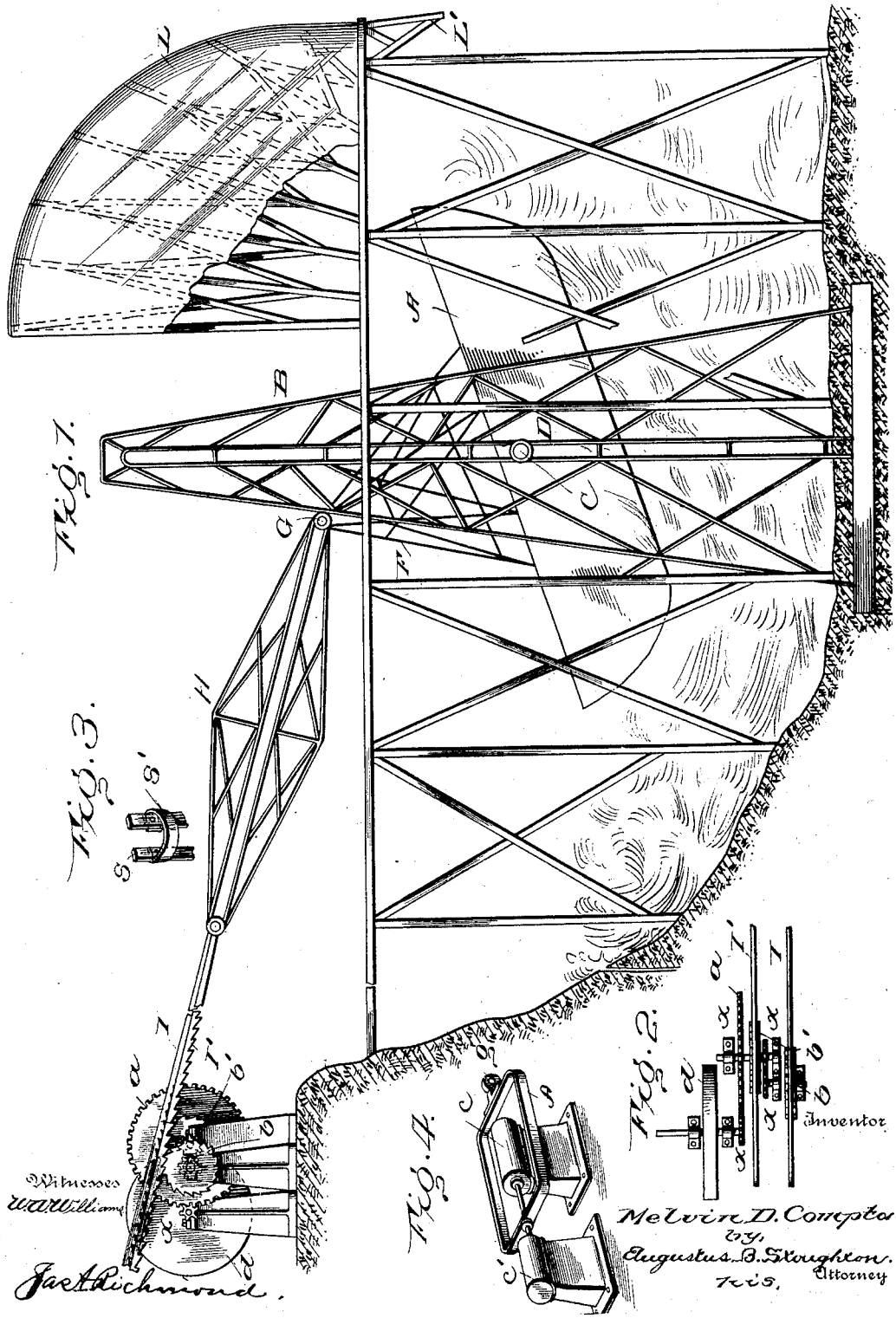

Patented April 12, 1904.

UNITED STATES PATENT OFFICE.

MELVIN D. COMPTON, OF NEW YORK, N. Y.

WAVE-MOTOR.

SPECIFICATION forming part of Letters Patent No. 756,833, dated April 12, 1904.

Application filed May 14, 1903. Serial No. 157,146. (No model.)

*To all whom it may concern:*

Be it known that I, MELVIN D. COMPTON, a citizen of the United States, residing at New York, in the county and State of New York, have invented a certain new and useful Wave-Motor, of which the following is a specification.

My invention relates to wave-motors and to means whereby the intermittent energy of the waves may be transformed into a constant source of power.

One object of the invention is to furnish an economical, efficient, and easily-erected device by which the action of the waves may be rendered available by being transformed into other forms of energy.

A further object of the invention is to provide means for protecting that part of the apparatus exposed to the waves from submergence or undue violence of the waves. Generally stated, the invention embodies a suitable support and a float mounted in relation to said support and free to follow each phase of wave activity, whereby, through the media of suitable transmuting apparatus, to store up energy in the form of compressed air, electricity, &c.

The invention further embodies a suitable support, a centrally-pivoted float free to rock and reciprocate in said support to accord with varying conditions of wave activity and height of tide, means for converting the motion of the float into other forms of energy, and means for protecting the float from submergence or undue violence of the waves.

The invention further consists in certain novel constructions, combinations, and arrangements of parts hereinafter referred to and finally claimed.

The nature, characteristic features, and scope of the invention will be readily understood from the following description, taken in connection with the accompanying drawings, forming a part hereof, wherein—

Figure 1 is a side elevational view of a wave-power embodying features of the invention. Fig. 2 is a top view of the translating mechanism. Fig. 3 is a detail illustrating a means of uniting the supporting-girders. Fig. 4 is a perspective view of an air-compressor (shown as an example) whose piston-carrying frame may be attached to the transmission-rod.

Referring to the drawings, A represents the float, here illustrated in the form of a boat, held in place by the standard B, consisting of suitable supporting-girders S, secured together by means of metal straps S'. The float is provided centrally with pivots C, which are free to move vertically in suitable ways D of the standard or support.

E represents the foundation of the standard, here shown as embedded in the sea-bottom.

F is a framework attached to and moving on a universal joint G for operating through the transmission-rod H the translating mechanism located on the shore or on a float adjacent to the wave-motor. In the form herein illustrated for utilizing the power, I I' are two rods forming a fork on the end of the transmission-rod H and provided with teeth cut opposite to each other.

$b$ $b'$ are ratchet-wheels engaged by the teeth on I I'.

$x$ $x$ represent intermediate gearing for communicating the motion of the rods I I' to the power-wheel $d$.

$c$ $c'$ are two cylinders of an air-compressor, the piston-frame of which is attached by the joint $g$ to the transmission-rod H.

L represents a protecting breakwater or wave-shield. Said shield may or may not be mounted on the standard or support B. In either event it is so located as to stand in the path of the waves acting upon the float A and so arranged that any wave of unusual size or violence will impinge against the shield and its violence or continuity be broken before reaching the oscillating float.

The operation may be described as follows: The float and its standard being located where there is a constant wave action, the motion of the waves causes the float A to rock up and down on its pivot C—in other words, giving it a bodily movement vertically and an endwise movement vertically. This rocking motion of the float is communicated, through the universal joint G, as a reciprocating motion to the transmission-rod H, to which are attached the oppositely-toothed rods I I'. The latter engage with the ratchet-wheels b b', and by means of the gears x x impart motion to the power-wheel d. The arrangement of the oppositely-toothed rods I I' with relation to the ratchet-wheels b b' is such that when the float rocks one way the teeth on rod I' engage and turn the ratchet-wheel b, and when it rocks the other way the teeth on rod I engage with the ratchet-wheel b'. The intermediate gears are so connected that a uniformly-directed motion of the power-wheel d results. As the tide rises and falls the float moves up and down in the slot or way D; but the parts are so arranged that at any angle of the transmission-rod H the teeth I and I' engage with the ratchet-wheels b b'. As mentioned above, the air-compressor c c' can be substituted for the transforming mechanism of Figs. 1 and 2 by simply attaching the piston-frame f to the rod H.

It is not necessary that the transforming mechanism be located on the shore, as it may be located on the standard supporting the float or on a structure adjacent thereto. The centrally-rocking float may even be attached to an anchored float. The compressed air or the electricity generated or stored may be transmitted to the place of consumption by tubes or wires.

It is understood that the shield L may be located either on the same structure as the float or adjacent thereto. The lower portion L' of the shield projects downward to such a height as to be about the same level as the top of the float A when the latter is at its position of maximum activity. This downward projection L' will help to split and break up any unusually violent wave.

It will be obvious to those skilled in the art to which the invention relates that modifications may be made in details without departing from the spirit and scope of the same. Hence I do not limit myself to the precise construction and arrangement of parts hereinabove referred to, and illustrated in the accompanying drawings.

Having described the nature and objects of the invention, what I claim as new, and desire to secure by Letters Patent, is—

1. The combination of a float having a bodily vertical movement and an endwise vertical movement, means for converting such movements of the float into other forms of energy, and means for protecting the float from submergence or unusual violence of the waves, substantially as specified.

2. The combination of an oscillating float, means coacting with the float for converting its movements into other forms of energy, and means for protecting the float from submergence or unusual violence of the waves, substantially as specified.

3. The combination of a support, a float disposed relatively to said support and having a reciprocatory and a rocking movement, means coacting with the float for converting its movements into other forms of energy, and means for protecting the float from submergence or unusual violence of the waves, substantially as specified.

4. The combination of a support, a float having a bodily vertical movement and an endwise vertical movement, means for converting such movements of the float into other forms of energy, and a shield or breakwater mounted on the support and adapted to protect the float from submergence or unusual violence of the waves, substantially as specified.

5. The combination of a support provided with ways, a float having pivotal bearings adapted to said ways, the arrangement being such that the float is free to rock and otherwise follow the rising and falling motion of the waves, means coacting with said float for converting its movements into other forms of energy, and a shield or breakwater mounted on the support and adapted to protect the float from submergence or unusual violence of the waves, substantially as specified.

6. In an apparatus for utilizing wave or tidal power, the combination of an oscillating float, and a shield or breakwater adapted to protect the same from submergence or unusual violence of the water, substantially as specified.

7. The combination of a centrally-rocking float, a standard for said float, means for transforming the rocking motion of the float into rectilinear, a pair of oppositely-toothed rods engaging with corresponding ratchet-wheels, and intermediate gears for insuring a uniformly-directed circular motion, substantially as specified.

In testimony whereof I have hereunto signed my name.

MELVIN D. COMPTON.

In presence of—
W. J. JACKSON,
JAS. A. RICHMOND.